US012223617B2

(12) United States Patent
Lee et al.

(10) Patent No.: US 12,223,617 B2
(45) Date of Patent: Feb. 11, 2025

(54) ELECTRONIC APPARATUS AND METHOD FOR REPRODUCING IMAGE BASED ON ARTIFICIAL INTELLIGENCE ACCORDING TO APPLICATION

(71) Applicant: SAMSUNG ELECTRONICS CO., LTD., Suwon-si (KR)

(72) Inventors: Jongseok Lee, Suwon-si (KR); Pilkyu Park, Suwon-si (KR); Kwangpyo Choi, Suwon-si (KR); Jaehwan Kim, Suwon-si (KR); Youngo Park, Suwon-si (KR); Chaeeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 17/893,754

(22) Filed: Aug. 23, 2022

(65) Prior Publication Data

US 2024/0054602 A1 Feb. 15, 2024

Related U.S. Application Data

(63) Continuation of application No. PCT/KR2022/011855, filed on Aug. 9, 2022.

(30) Foreign Application Priority Data

Aug. 10, 2021 (KR) ........................ 10-2021-0105605

(51) Int. Cl.
*G06T 3/4046* (2024.01)
*G06T 7/00* (2017.01)
(Continued)

(52) U.S. Cl.
CPC .......... *G06T 3/4046* (2013.01); *G06T 7/0002* (2013.01); *G06V 10/56* (2022.01);
(Continued)

(58) Field of Classification Search
CPC ................. G06T 3/4046; G06T 7/0002; G06T 2207/20081; G06T 2207/30168; G06V 10/56
See application file for complete search history.

(56) References Cited

U.S. PATENT DOCUMENTS 7,801,382 B2 * 9/2010 Hernandez ............. H04N 19/46 382/128
8,924,395 B2 * 12/2014 Wade ...................... G06F 16/22 707/707
(Continued)

FOREIGN PATENT DOCUMENTS

JP 2002-341849 A 11/2002
KR 10-2015-0088121 A 7/2015
(Continued)

OTHER PUBLICATIONS

Yu et al., "Deep Convolution Networks for Compression Artifacts Reduction", 2016, IEEE, arXiv:1608.02778v1 [cs.CV], 13 pages total.
(Continued)

*Primary Examiner* — Antonio A Caschera
(74) *Attorney, Agent, or Firm* — Sughrue Mion, PLLC

(57) ABSTRACT

An electronic apparatus includes: a display; and a processor configured to: obtain a first image, identify an application used to obtain the first image, select neural network setting information corresponding to the identified application from among a plurality of pieces of neural network setting information, obtain a second image by artificial intelligence (AI)-upscaling the first image by using an upscaling neural network to which the selected neural network setting information is applied, and output the obtained second image via the display.

18 Claims, 13 Drawing Sheets

(51) Int. Cl.
*G06V 10/56* (2022.01)
*G06V 10/77* (2022.01)

(52) U.S. Cl.
CPC .................... *G06V 10/7715* (2022.01); *G06T 2207/20081* (2013.01); *G06T 2207/30168* (2013.01)

(56) References Cited

U.S. PATENT DOCUMENTS

| | | | |
|---|---|---|---|
| 10,825,139 B2 | 11/2020 | Kim et al. | |
| 10,825,205 B2 | 11/2020 | Kim et al. | |
| 11,095,925 B2 | 8/2021 | Jang | |
| 11,475,540 B2 | 10/2022 | Na et al. | |
| 2013/0113818 A1 | 5/2013 | Dumbeck et al. | |
| 2014/0072242 A1* | 3/2014 | Wei | H04N 19/14 382/299 |
| 2021/0058653 A1* | 2/2021 | Jang | G06T 3/4053 |
| 2021/0104018 A1 | 4/2021 | Moon et al. | |
| 2021/0160556 A1 | 5/2021 | Jang | |
| 2022/0076459 A1 | 3/2022 | Zhang et al. | |
| 2022/0092735 A1 | 3/2022 | Tai et al. | |
| 2022/0230296 A1 | 7/2022 | Baek et al. | |

FOREIGN PATENT DOCUMENTS

| | | |
|---|---|---|
| KR | 10-2019-0048196 A | 5/2019 |
| KR | 10-1993001 B1 | 6/2019 |
| KR | 10-2019-0103047 A | 9/2019 |
| KR | 10-2019-0119550 A | 10/2019 |
| KR | 10-2019-0130479 A | 11/2019 |
| KR | 10-2020-0132682 A | 11/2020 |
| KR | 10-2190483 B1 | 12/2020 |
| KR | 10-2021-0062477 A | 5/2021 |
| KR | 10-2021-0067699 A | 6/2021 |
| KR | 10-2021-0067783 A | 6/2021 |

OTHER PUBLICATIONS

Ledwig, et al., "Photo-Realistic Single Image Super-Resolution Using a Generative Adversarial Network", 2017, Twitter, arXiv:1609.04802v5 [cs.CV], 19 pages total.
Dong, et al., "Image Super-Resolution Using Deep Convolutional Networks", 2015, IEEE, arXiv:1501.00092v3 [cs.CV], 14 pages total.
International Search Report & Written Opinion (PCT/ISA/220, PCT/ISA/210, PCT/ISA/237) issued Nov. 14, 2022 by the International Searching Authority in International Patent Application No. PCT/KR2022/011855.
Sumedh Pendurkar et al., "Single Image Super-Resolution for Optical Satellite Scenes Using Deep Deconvolutional Network", Image Analysis and Processing—ICIAP 2019: 20th International Conference, Deconv-nets for Optical Satellite Scenes, Sep. 9, 2019, pp. 410-420, https://doi.org/10.1007/978-3-030-30642-7_37.
Chua, Kah Keong, et al., "Enhanced image super-resolution technique using convolutional neural network." Advances in Visual Informatics: Third International Visual Informatics Conference, IVIC 2013, Nov. 13, 2013, Proceedings 3. Springer International Publishing, pp. 157-164.
Lee, Royson et al., "Deep neural network-based enhancement for image and video streaming systems: A survey and future directions", ACM Computing Surveys (CSUR) 54.8, Jun. 7, 2021, pp. 1-30, arXiv:2106.03727 [eess.IV].
Communication issued Sep. 10, 2024 by the European Patent Office for European Patent Application No. 22856176.7.

* cited by examiner 300
115
310
Conv
3X3X4
320
325
330
Conv
3X3X4
340
345
350
Conv
3X3X1
125

FIG. 5

| APPLICATION | NEURAL NETWORK SETTING INFORMATION |
| --- | --- |
| A | P |
| B | Q |
| C | R |

FIG. 6

| APPLICATION | PROVIDER | ADDRESS | IMAGE-RELATED INFORMATION |
|---|---|---|---|
| A | abc | www.abc.com | SD, 2Mbps, AV1 |
| B | bcd | www.bcd.com | SD, 5Mbps, H.264 |
| C | cde | www.cde.com | HD, 10Mbps, HEVC |

700
125
782
784
786
770
Clipping layer
750
Depth to Space
740
Conv 3X3X(6n)
730
Conv 3X3X32
720
Conv 3X3X32
710
Scaler
760
Scaler
752
754
756
702
704
706
115

900
125
972
974
976
960
Clipping layer
940
Depth to Space
942
950
Scaler
930
Conv 3X3X16
920
Conv 3X3X32
910
Conv 3X3X32
706
704
702
115

ELECTRONIC APPARATUS AND METHOD FOR REPRODUCING IMAGE BASED ON ARTIFICIAL INTELLIGENCE ACCORDING TO APPLICATION

CROSS-REFERENCE TO RELATED APPLICATIONS

This application is a continuation of International Application No. PCT/KR2022/011855, filed on Aug. 9, 2022, which is based on and claims priority to Korean Patent Application No. 10-2021-0105605, filed on Aug. 10, 2021, in the Korean Intellectual Property Office, the disclosure of which is incorporated by reference herein in its entirety.

BACKGROUND

1. Field

The disclosure relates to artificial intelligence (AI)-based image reproduction, and more specifically, the disclosure relates to AI-based image reproduction according to an application used to obtain an image.

2. Description of Related Art

With advancements of processing capabilities and networks of electronic apparatuses, the experience of viewing images in real time through applications installed on the electronic apparatuses has become common. In addition, as the number of services that provide images increases, accessibility of images has become easier.

However, there are still many cases in which the quality of images provided through an application is unsatisfactory due to limitations in the bandwidth of networks and the processing capability of electronic apparatuses.

A method of improving image quality by post-processing images provided from a provider through an application may be considered. However, because characteristics of the images differ depending on the provider or the application, satisfactory quality may not be guaranteed even when the images are post-processed based on a single rule.

Therefore, there is a need for a method capable of maximizing image quality by processing images based on artificial intelligence (AI).

SUMMARY

Provided are an electronic apparatus and method which may effectively improve image quality by processing an image based on AI according to characteristics of the image provided through an application.

In addition, provided are an electronic apparatus and method which may effectively improve image quality by predicting an application through which an image prestored in the electronic apparatus is provided.

In addition, provided is a neural network structure suitable for a YUV format of an image.

According to an embodiment of the disclosure, an electronic apparatus for reproducing an image by using artificial intelligence (AI) includes: a display; and a processor configured to execute one or more instructions stored in the electronic apparatus to: obtain a first image; identify an application used to obtain the first image; select neural network setting information corresponding to the identified application from among a plurality of pieces of neural network setting information; obtain a second image by AI-upscaling the first image through an upscaling neural network to which the selected neural network setting information is applied; and provide the obtained second image to the display.

According to an embodiment of the disclosure, image quality may be effectively improved by processing images based on AI according to characteristics of images provided through an application.

In addition, according to an embodiment of the disclosure, image quality may be effectively improved by predicting an application through which an image prestored in an electronic apparatus is provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram illustrating a correspondence relationship between various applications and various pieces of neural network setting information;

FIG. 6 is a diagram illustrating information related to applications required to obtain an image;

DETAILED DESCRIPTION

Figure 1A:
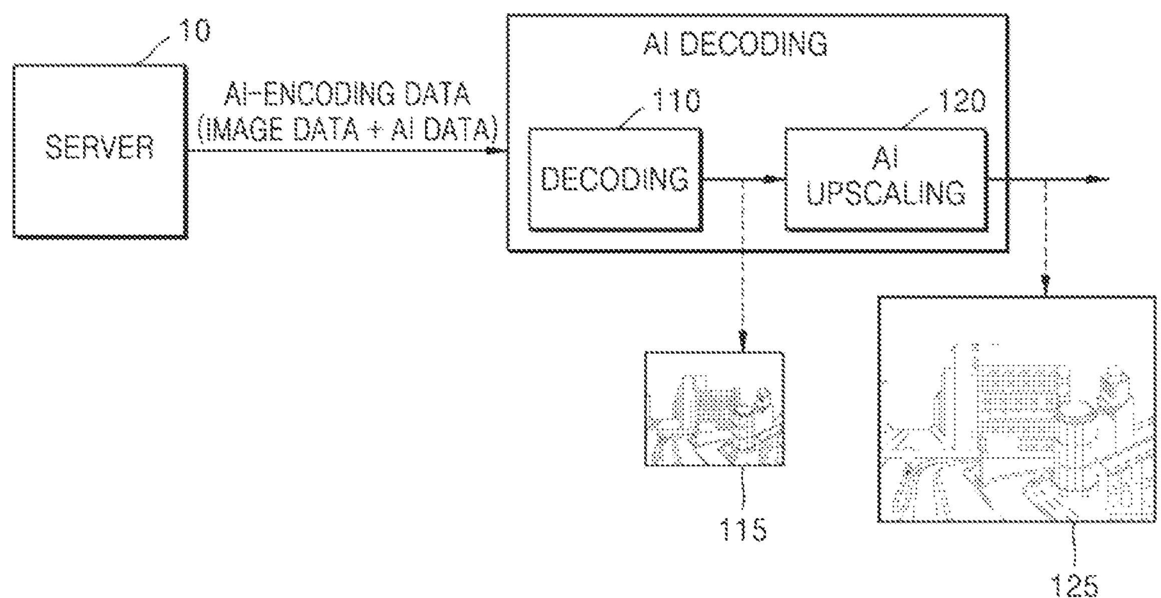
FIG. 1A is a diagram for describing an artificial intelligence (AI) decoding process according to an embodiment of the disclosure.

According to an aspect of the disclosure, an electronic apparatus for reproducing an image, includes: a display; and a processor configured to: obtain a first image, identify an application used to obtain the first image, select neural network setting information corresponding to the identified application from among a plurality of pieces of neural network setting information, obtain a second image by artificial intelligence (AI)-upscaling the first image by using an upscaling neural network to which the selected neural network setting information is applied, and output the obtained second image via the display.

The processor may be further configured to select the neural network setting information by comparing information about images provided through a plurality of applications with information related to the first image.

The processor may be further configured to: identify an address accessed by a web browser to obtain the first image, and select the neural network setting information by comparing the identified address with addresses corresponding to a plurality of applications.

The upscaling neural network may be trained based on a comparison of an original training image with a second training image that is AI-upscaled, by the upscaling neural network, from a first training image provided through a plurality of applications.

Neural network setting information corresponding to a first application may be obtained through training the upscaling neural network based on a first training image provided by the first application from among the plurality of applications, and neural network setting information corresponding to a second application may be obtained through training the upscaling neural network based on a first training image provided by the second application from among the plurality of applications.

The processor may be further configured to: determine whether to perform the AI upscaling based on a comparison of a resolution of the obtained first image with a predetermined resolution, based on determining not to perform the AI upscaling, output the first image via the display, and based on determining to perform the AI upscaling, output the second image via the display.

The first image may include a first sub-image of a first color component, a second sub-image of a second color component, and a third sub-image of a third color component, a size of the first sub-image is greater than a size of the second sub-image and a size of the third sub-image, the upscaling neural network may include: a first scaling layer configured to scale the size of the second sub-image and the size of the third sub-image to be equal to the size of the first sub-image; at least one convolution layer configured to perform a convolution process on the first sub-image, the scaled second sub-image, and the scaled third sub-image; and a depth-to-space layer configured to generate a feature map of the first color component, a feature map of the second color component, and a feature map of the third color component by combining parts of feature maps output from the at least one convolution layer, and the processor may be further configured to obtain the second image including a fourth sub-image of the first color component corresponding to the feature map of the first color component, a fifth sub-image of the second color component corresponding the feature map of the second color component, and a sixth sub-image of the third color component corresponding to the feature map of the third color component.

The size of the first sub-image may be n times greater than the size of the second sub-image and the size of the third sub-image, n being a natural number, and a number of feature maps used to generate the feature map of the first color component may be n times greater than a number of feature maps used to generate the feature map of the second color component and the feature map of the third color component.

The upscaling neural network may further include a second scaling layer configured to scale the first sub-image, the second sub-image, and the third sub-image, based on a scaling factor of the upscaling neural network, and the processor may be further configured to obtain the fourth sub-image by adding the scaled first sub-image to the feature map of the first color component, obtain the fifth sub-image by adding the scaled second sub-image to the feature map of the second color component, and obtain the sixth sub-image by adding the scaled third sub-image to the feature map of the third color component.

Sample values of the fourth sub-image, the fifth sub-image, and the sixth sub-image may be clipped to a value within a predetermined range.

The first image may include a first sub-image of a first color component, a second sub-image of a second color component, and a third sub-image of a third color component, the upscaling neural network may include: at least one convolution layer configured to perform a convolution process on the first sub-image; and a depth-to-space layer configured to generate a feature map of the first color component by combining feature maps output from the at least one convolution layer, and wherein the processor may be further configured to obtain the second image including a fourth sub-image of the first color component corresponding to the feature map of the first color component, a fifth sub-image of the second color component scaled from the second sub-image by a scaling factor of the upscaling neural network, and a sixth sub-image of the third color component scaled from the third sub-image by a scaling factor of the upscaling neural network.

According to an aspect of the disclosure, a method of reproducing an image, the method including: obtaining a first image; identifying an application used to obtain the first image; selecting neural network setting information corresponding to the identified application from among a plurality of pieces of neural network setting information; obtaining a second image by artificial intelligence (AI)-upscaling the first image by using an upscaling neural network to which the selected neural network setting information is applied; and providing the obtained second image to a display.

The selecting the neural network setting information may include selecting the neural network setting information based on a comparison of information about images provided through a plurality of applications with information related to the first image.

The selecting the neural network setting information may include: identifying an address accessed by a web browser to obtain the first image; and selecting the neural network setting information by comparing the identified address with addresses corresponding to a plurality of applications.

According to an aspect of the disclosure, a non-transitory computer-readable recording medium having recorded thereon a program that is executable by a computer to perform a method of reproducing an image, the method including: obtaining a first image; identifying an application used to obtain the first image; selecting neural network setting information corresponding to the identified application from among a plurality of pieces of neural network setting information; obtaining a second image by artificial intelligence (AI)-upscaling the first image by using an upscaling neural network to which the selected neural network setting information is applied; and providing the obtained second image to a display.

MODE OF DISCLOSURE

Throughout the disclosure, the expression "at least one of a, b or c" indicates only a, only b, only c, both a and b, both a and c, both b and c, or all of a, b, and c.

As the present description allows for various changes and numerous embodiments of the disclosure, certain embodiments of the disclosure will be illustrated in the drawings and described in detail in the written description. However, this is not intended to limit the embodiments of the disclosure, and it will be understood that the disclosure includes all modifications, equivalents, and substitutes falling within the spirit and scope of various embodiments of the disclosure.

In describing the disclosure, when the detailed description of the relevant known functions or configurations is determined to unnecessarily obscure the gist of the disclosure, the detailed description thereof may be omitted herein. Also, numbers (e.g., first, second, etc.) used in the description of the present specification are merely identification symbols for distinguishing one element from another.

Also, when one element is referred to as "connected" or "coupled" to another element, the one element may be directly connected or coupled to the other element, but it will be understood that the elements may be connected or coupled to each other via another element therebetween unless the context clearly indicates otherwise.

Also, an element represented by " . . . er(or) (unit)," "module," etc. in the present specification may be one element in which two or more elements are combined, or may be divided into two or more element for each more subdivided function. Also, each of the elements to be described below may additionally perform, in addition to the main function thereof, some or all of the functions that other elements are responsible for, and some of the main functions that the respective elements are responsible for may be dedicated by other elements.

Also, in the present specification, an "image" or a "picture" may represent a still image, a moving image including a plurality of consecutive still images (or frames), or a video.

Also, in the present specification, a "sample" may be data (e.g., a pixel) allocated to a sampling position of an image or a feature map.

Also, in the present specification, a "provider" is a subject that provides an image to an electronic apparatus, and may refer to a company, a server operated by a company, a service operated by a company, or a server for providing a service operated by a company.

In addition, in the present specification, an "application" refers to a program required to obtain an image from a provider via a network (e.g., the Internet). The application may be provided from a provider or an external server to an electronic apparatus and installed on the electronic apparatus, or may be installed on the electronic apparatus during a process of manufacturing the electronic apparatus.

Also, in the present specification, a "neural network" is a representative example of an artificial neural network model that simulates a cranial nerve, and is not limited to an artificial neural network model using a specific algorithm. A neural network may also be referred to as a deep neural network.

Also, in the present specification, "parameters" are values used in an operation process of each layer constituting a neural network, and may include, for example, weights and/or biases used when an input value is applied to a certain operation expression. Parameters may be expressed in a matrix form. Parameters are values set as a result of training and may be updated through separate training data as necessary.

Also, in the present specification, "neural network setting information" is information related to elements constituting a neural network and includes the above-described parameters. A neural network may be configured by using neural network setting information. Neural network setting information may be referred to as deep neural network information.

Also, in the present specification, a "first image" refers to an image to be AI-upscaled, and a "second image" refers to an image generated by AI upscaling.

Also, in the present specification, "encoding" refers to a process performed by a frequency transformation-based image compression method. Also, in the specification, "decoding" refers to a process performed by a frequency transformation-based image reconstruction method.

FIG. 1A is a diagram for describing an AI decoding process according to an embodiment of the disclosure.

As described above, because quality of an image provided via a network is often unsatisfactory and quality deterioration characteristics differ depending on an application, there is a need for a method of efficiently improving quality of an image considering an application used to obtain the image.

As illustrated in FIG. 1A, a second image 125 is obtained by performing an AI decoding process on AI-encoding data provided from a server 10 (or a provider).

The AI-encoding data may include image data and AI data.

The image data may be provided as a bitstream. The image data is data generated as a result of performing an encoding process on a first image 115, and may include data obtained based on pixel values in the first image 115, for example, residual data that is the difference between the first image 115 and predicted data of the first image 115. Also, the image data includes pieces of information used in the process of performing the encoding process on the first image 115. For example, the image data may include prediction mode information used to perform the encoding process on the first image 115, motion information, information related to quantization parameters used in the encoding process, and the like. The image data may be generated in accordance with a rule (e.g., a syntax) of an image compression method using frequency transformation, such as MPEG-2, H.264 AVC, MPEG-4, HEVC, VC-1, VP8, VP9, and AV1.

The AI data may be used to select neural network setting information used in an AI upscaling process 120 to be described below. The AI data will be described in detail with reference to FIG. 2. According to an embodiment, the AI-encoding data may include only image data.

A decoding process 110 illustrated in FIG. 1A will be described in detail. The decoding process 110 may include a process of generating quantized residual data by performing entropy decoding on image data, a process of performing inverse quantization on the quantized residual data, a process of transforming residual data of a frequency domain component into a spatial domain component, a process of generating predicted data, a process of reconstructing the first image 115 by using the predicted data and the residual data, and the like. The decoding process 110 may be implemented through at least one image reconstruction method using frequency transformation such as MPEG-2, H.264, MPEG-4, HEVC, VC-1, VP8, VP9, and AV1.

In the AI upscaling process 120, AI upscaling is performed on the first image 115 so as to obtain a second image 125 having a certain resolution and/or a certain image quality.

The AI in the AI upscaling process 120 may be implemented as a neural network. As will be described below with reference to FIG. 10, because an upscaling neural network is trained through loss information calculated for each application, the first image 115 may be AI-upscaled to a desired image quality and/or a desired resolution according to characteristics of the application.

Figure 1B:
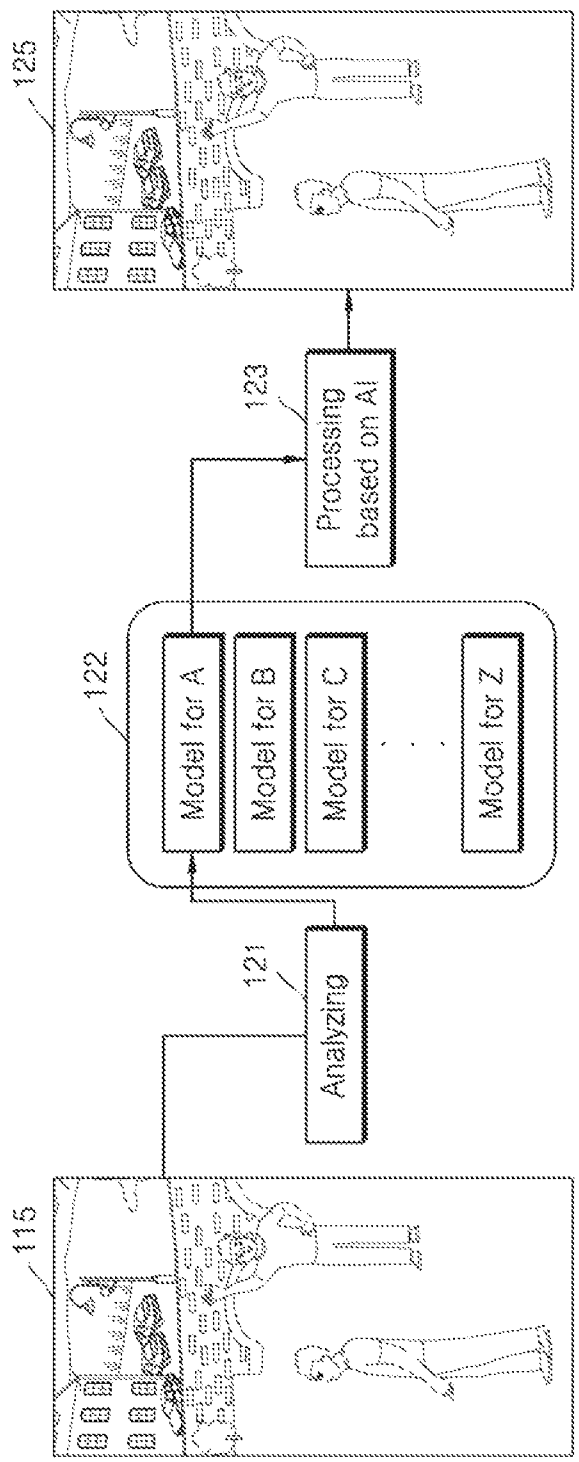
FIG. 1B is a diagram for describing an AI upscaling process illustrated in FIG. 1A.

FIG. 1B is a diagram for describing the AI upscaling process 120 illustrated in FIG. 1A.

In the AI upscaling process 120, which model is suitable for AI-upscaling the first image 115 may be determined through analysis 121 of the first image 115. Specifically, an application through which the first image 115 is obtained may be confirmed through the analysis 121 of the first image 115, and a model which is suitable for an AI-based process 123 on the first image 115 among a plurality of prestored models 122 may be determined through the analysis 121 of the first image 115.

As illustrated in FIG. 1B, when a model for "A" is selected through the analysis 121 of the image, the second image 125 may be obtained by performing the AI-based process 123 on the first image 115 based on the model for "A."

The AI upscaling process 120 will be described in detail below.

Figure 2:
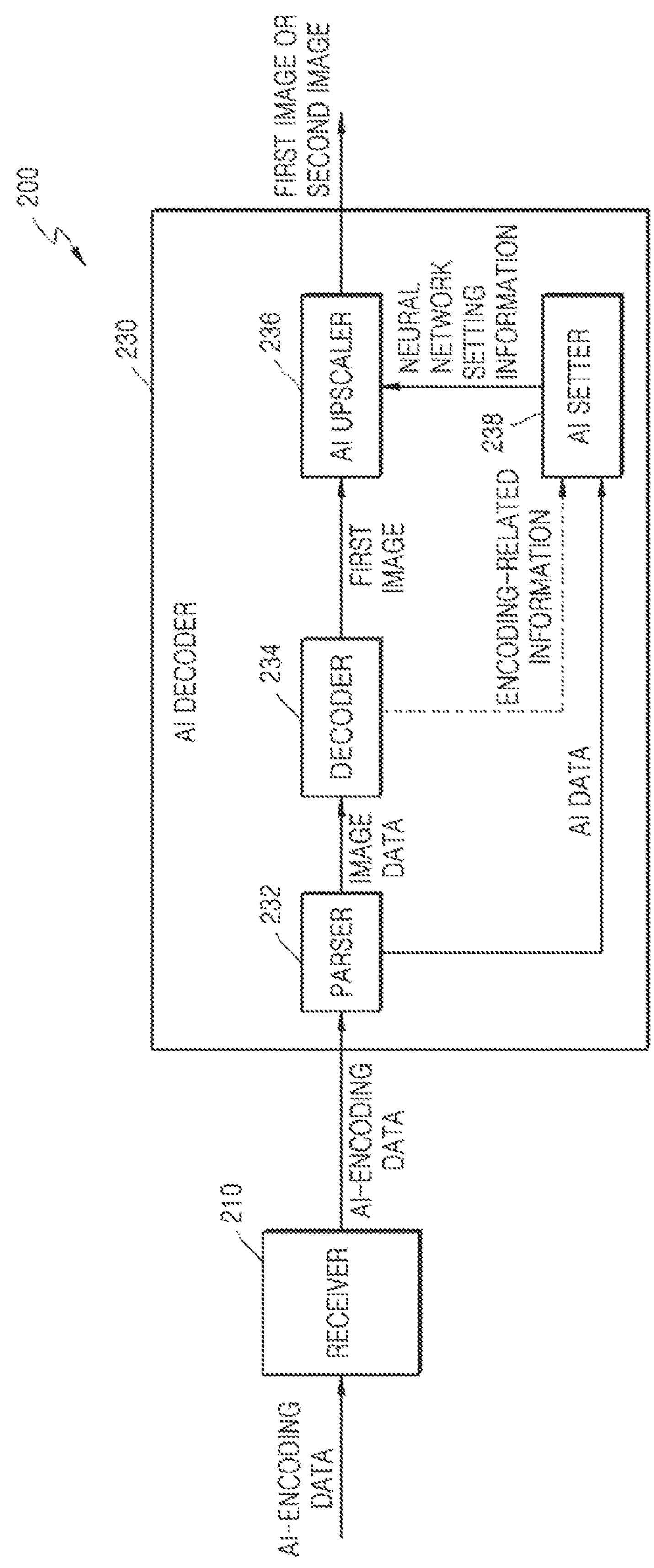
FIG. 2 is a block diagram illustrating a configuration of an electronic apparatus, according to an embodiment of the disclosure.

FIG. 2 is a block diagram illustrating a configuration of an electronic apparatus 200, according to an embodiment of the disclosure.

Referring to FIG. 2, the electronic apparatus 200 according to an embodiment of the disclosure includes a receiver 210 and an AI decoder 230. The AI decoder 230 may include a parser 232, a decoder 234, an AI upscaler 236, and an AI setter 238.

The electronic apparatus 200 may include various types of apparatuses capable of reproducing an image, such as a smartphone, a tablet personal computer (PC), a wearable device, a laptop, and a desktop PC.

In FIG. 2, the receiver 210 and the AI decoder 230 are illustrated as separate devices, but the receiver 210 and the AI decoder 230 may be implemented through a single processor. In this case, the receiver 210 and the AI decoder 230 may be implemented as a dedicated processor, or may be implemented by a combination of software and a general-purpose processor such as an application processor (AP), a central processing unit (CPU), or a graphics processing unit (GPU). Also, in the case of a dedicated processor, the dedicated processor may include a memory for implementing the embodiment of the disclosure, or may include a memory processor for using an external memory.

The receiver 210 and the AI decoder 230 may include a plurality of processors. In this case, the receiver 210 and the AI decoder 230 may be implemented by a combination of dedicated processors, or may be implemented by a combination of software and a plurality of general-purpose processors such as an AP, a CPU, or a GPU.

In an embodiment of the disclosure, the receiver 210 may be implemented as a first processor, the parser 232 and the decoder 234 may be implemented as a second processor that is different from the first processor, and the AI upscaler 236 and the AI setter 238 may be implemented as a third processor that is different from the first processor and the second processor.

The receiver 210 receives AI-encoding data for the first image 115. The AI-encoding data may include AI data and image data generated as a result of encoding the first image 115. According to an embodiment, the AI-encoding data may include only image data.

In an embodiment of the disclosure, the receiver 210 may receive AI-encoding data transmitted from the server 10 (or the provider) via the network. Also, in an embodiment of the disclosure, the receiver 210 may obtain AI-encoding data from a data storage medium, for example, a magnetic medium such as a hard disk, a floppy disk, and magnetic tape, an optical recording medium such as a CD-ROM and a DVD, and a magneto-optical medium such as a floptical disk.

The receiver 210 may receive the AI-encoding data from the server 10 through the application, and the AI decoder 230 may obtain the second image 125 by AI-decoding the AI-encoding data. Alternatively, the AI-encoding data may be previously received by the receiver 210 and stored in the storage medium of the electronic apparatus 200. The AI decoder 230 may obtain the second image 125 by AI-decoding the AI-encoding data stored in the storage medium in response to a request from a user or the like.

The receiver 210 outputs the AI-encoding data to the parser 232.

The parser 232 parses the AI-encoding data and divides the AI-encoding data into image data and AI data. For example, the parser 232 may read a header of data obtained from the receiver 210 and determine whether the data is image data or AI data. In one example, the parser 214 determines the image data and the AI data by referring to the header of the data received through the receiver 210, and transmits the image data and the AI data to the decoder 234 and the AI setter 238, respectively. At this time, it may be confirmed that the image data included in the AI-encoding data is image data generated through a certain codec (e.g., MPEG-2, H.264, MPEG-4, HEVC, VC-1, VP8, VP9, or AV1). In this case, the corresponding information may be transmitted to the decoder 234 so that the image data may be processed by the identified codec.

The decoder 234 obtains the first image 115 by decoding the image data. The first image 115 obtained by the decoder 234 is provided to the AI upscaler 236. In an embodiment of the disclosure, the decoder 234 may provide information related to the encoding of the first image 115 to the AI setter 238. The information related to the encoding of the first image 115 may include a codec type, prediction mode information, motion information, quantization parameter (QP) information, and the like, which are used to encode the first image 115. As will be described below, the information related to the encoding provided from the decoder 234 to the AI setter 238 may be used to select neural network setting information for AI upscaling of the first image 115.

According to an embodiment, the receiver 210 may receive the first image 115 itself from the provider. Receiving the first image 115 itself may be understood as receiving pixel values of the first image 115. In this case, the receiver 210 provides the first image 115 to the AI upscaler 236, and the decoder 234 does not perform the decoding process.

Hereinafter, obtaining the first image 115 may mean receiving the AI-encoding data (or the image data) for the first image 115 or obtaining the first image 115 itself.

The AI setter 238 may identify the application used (or executed) to obtain the first image 115, and determine an upscale target based on the identified application. The upscale target may indicate, for example, to what resolution and/or quality the first image 115 has to be upscaled.

Determining the upscale target may be understood as a process of selecting neural network setting information corresponding to an application used to obtain the first image 115 from among a plurality of pieces of prestored neural network setting information.

When the upscale target is determined, the AI setter 238 transmits, to the AI upscaler 236, the neural network setting information corresponding to the identified application. The AI upscaler 236 performs an AI upscaling process on the first image 115 through the upscaling neural network so as to obtain the second image 125 corresponding to the upscale target.

The AI upscaler 236 may determine whether to perform the AI upscaling process on the first image 115. The AI upscaler 236 may compare the resolution of the first image 115 with a predetermined resolution so as to determine the type of the image output from the AI decoder 230.

For example, when the resolution of the first image 115 is less than or equal to a first predetermined resolution or greater than a second predetermined resolution that is greater than the first predetermined resolution, the AI upscaler 236 determines not to perform the AI upscaling process on the first image 115, and outputs the first image 115 from the AI decoder 230. When the resolution of the first image 115 is less than or equal to the first predetermined resolution, the first image 115 is determined as a thumbnail image and the AI upscaling of the first image 115 is skipped. When the resolution of the first image 115 is greater than the second predetermined resolution, the quality of the first image 115 is determined as a satisfactory level and the AI upscaling of the first image 115 is skipped.

When the resolution of the first image 115 is between the first predetermined resolution and the second predetermined resolution, the AI upscaler 236 determines to perform the AI upscaling process on the first image 115, and the second image 125 obtained as a result of performing the AI upscaling process on the first image 115 is output from the AI decoder 230.

As described above, the AI setter 238 selects the neural network setting information corresponding to the application used to obtain the first image 115. Prior to describing a method, performed by the AI setter 238, of selecting neural network setting information, an AI upscaling process through an upscaling neural network will be described with reference to FIGS. 3 and 4.

Figure 3:
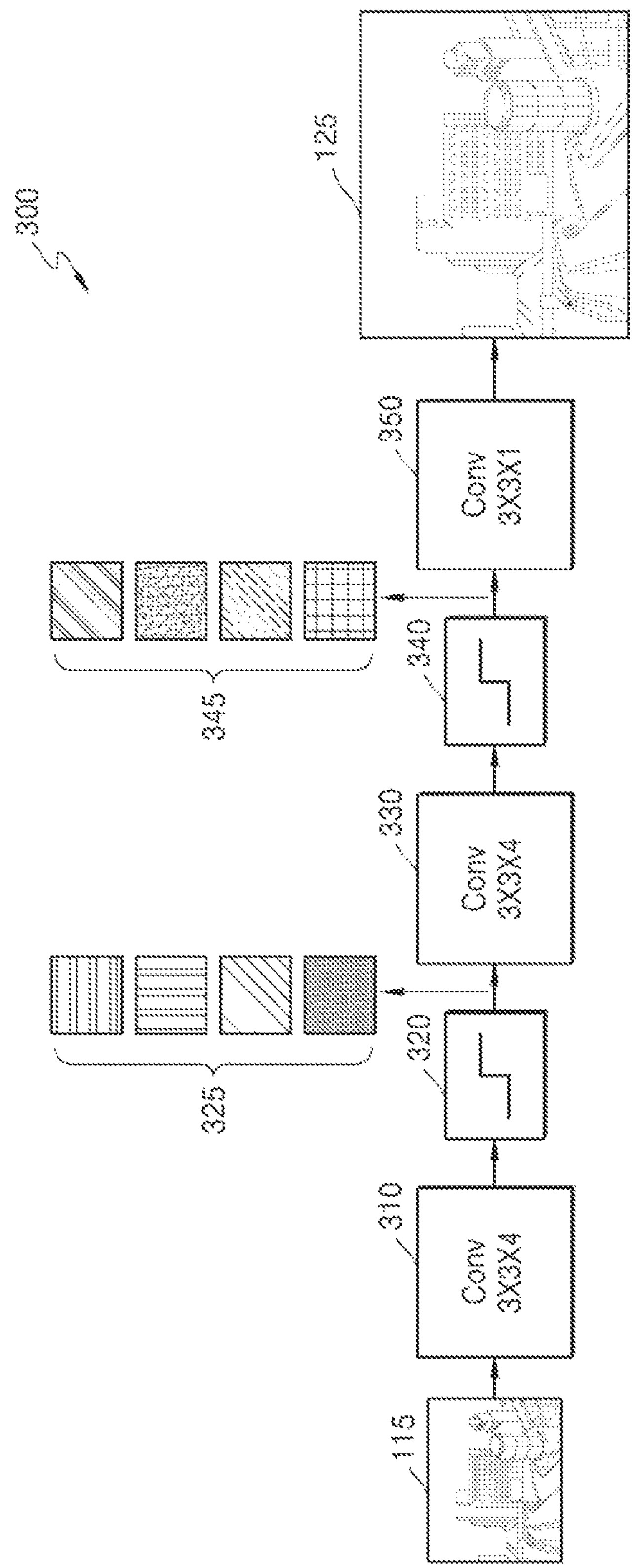
FIG. 3 is a diagram illustrating an upscaling neural network for AI upscaling of a first image.
Figure 4:
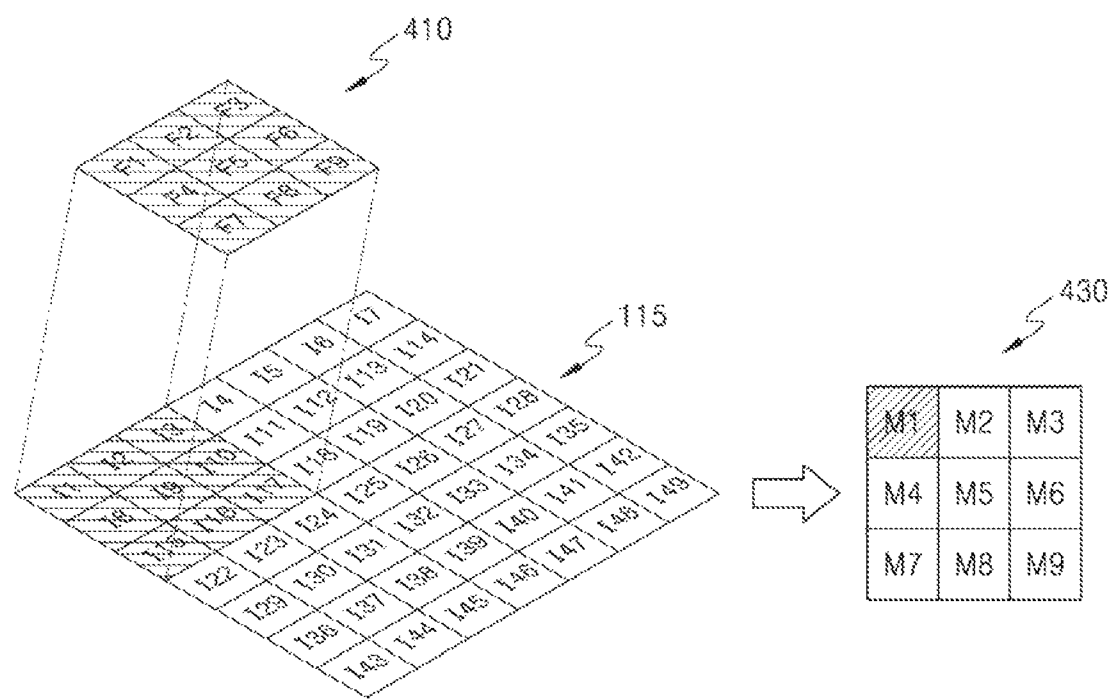
FIG. 4 is a diagram for describing a convolution operation using a convolution layer.

FIG. 3 is a diagram illustrating an upscaling neural network 300 for AI upscaling of a first image 115, and FIG. 4 illustrates a convolution operation in a first convolution layer 310 of FIG. 3.

As illustrated in FIG. 3, the first image 115 is input to the first convolution layer 310. 3×3×4 indicated in the first convolution layer 310 illustrated in FIG. 3 exemplifies a convolution process on one input image by using four filter kernels each having a 3×3 size. As a result of the convolution process, four feature maps are generated by the four filter kernels. The four feature maps represent unique characteristics of the first image 115. For example, the four feature maps may represent a vertical direction characteristic, a horizontal direction characteristic, or an edge characteristic of the first image 115.

Referring to FIG. 4, the convolution operation in the first convolution layer 310 will be described in detail.

One feature map 430 may be generated through a multiplication operation and an addition operation between the parameters of a filter kernel 410 having a 3×3 size used in the first convolution layer 310 and pixel values of the first image 115 corresponding thereto. Because the four filter kernels are used in the first convolution layer 310, four feature maps may be generated through the convolution operation process using the four filter kernels.

In FIGS. 4, I1 to I49 indicated in the first image 115 represent the pixels of the first image 115, and F1 to F9 indicated in the filter kernel 410 represent the parameters of the filter kernel 410. Also, M1 to M9 indicated in the feature map 430 represent samples of the feature map 430.

FIG. 4 illustrates that the first image 115 includes 49 pixels, but this is only an example. When the first image 115 has a 4K resolution, the first image 115 may include, for example, 3840×2160 pixels.

In the convolution operation process, a multiplication operation may be performed on the pixel values of the pixels I1, I2, I3, I8, I9, I10, I15, I16, and I17 of the first image 115 and the parameters F1, F2, F3, F4, F5, F6, F7, F8, and F9 of the filter kernel 410, and a value obtained by combining (e.g., by performing an addition operation on) the result values of the multiplication operation may be assigned as the value of the sample M1 of the feature map 430. When a stride of the convolution operation is 2, the multiplication operation may be performed on the pixel values of the pixels I3, I4, I5, I10, I11, I12, I17, I18, and I19 of the first image 115 and the parameters F1, F2, F3, F4, F5, F6, F7, F8, and F9 of the filter kernel 410, and a value obtained by combining the result values of the multiplication operation may be assigned as the value of the sample M2 of the feature map 430.

While the filter kernel 410 moves along the stride until reaching the last pixel of the first image 115, the convolution operation between the pixel values of the first image 115 and the parameters of the filter kernel 410 may be performed to obtain the feature map 430 having a certain size.

According to the disclosure, the values of the parameters of the upscaling neural network 300, for example, the parameters of the filter kernel used in the convolution layers of the upscaling neural network 300 (e.g., F1, F2, F3, F4, F5, F6, F7, F8, and F9 of the filter kernel) may be optimized through the training of the upscaling neural network 300.

The AI setter 238 may determine the upscale target corresponding to the application used to obtain the first image 115, and may determine the parameters of the filter kernel used in the convolution layers of the upscaling neural network 300.

The convolution layers included in the upscaling neural network 300 may perform the convolution operation process described with reference to FIG. 4, but the convolution operation process described with reference to FIG. 4 is only an example, and embodiments of the disclosure are not limited thereto.

Referring back to FIG. 3, the feature maps output from the first convolution layer 310 are input to a first activation layer 320.

The first activation layer 320 may impart non-linear characteristics to each feature map. The first activation layer 320 may include a sigmoid function, a Tanh function, a rectified linear unit (ReLU) function, and the like, but is not limited thereto.

Imparting the non-linear characteristics in the first activation layer 320 means changing and outputting some sample values of the feature map, which are the output of the first convolution layer 310. At this time, the change is performed by applying the non-linear characteristics.

The first activation layer 320 determines whether to transmit the sample values of the feature maps output from the first convolution layer 310 to a second convolution layer 330. For example, some sample values of the feature maps are activated by the first activation layer 320 and are transmitted to the second convolution layer 330, and some sample values thereof are deactivated by the first activation layer 320 and are not transmitted to the second convolution layer 330. Unique characteristics of the first image 115 represented by the feature maps are emphasized by the first activation layer 320.

Feature maps 325 output from the first activation layer 320 are input to the second convolution layer 330. One of the feature maps 325 illustrated in FIG. 3 is a result of processing the feature map 430 described with reference to FIG. 4 in the first activation layer 320.

3×3×4 indicated in the second convolution layer 330 exemplifies a convolution process on the input feature maps 325 by using four 3×3×4 filter kernels each having a 3×3 size. The output of the second convolution layer 330 is input to the second activation layer 340. The second activation layer 340 may impart non-linear characteristics to the input data.

Feature maps 345 output from the second activation layer 340 are input to the third convolution layer 350. 3×3×1 indicated in the third convolution layer 350 exemplifies a convolution process for producing one output image by using one filter kernel having a 3×3 size. The third convolution layer 350 is a layer for outputting a final image and generates one output by using one filter kernel.

According to an embodiment of the disclosure, the third convolution layer 350 may output the second image 125 through the convolution operation.

There may be a plurality of pieces of neural network setting information indicating the number of filter kernels of the first convolution layer 310, the second convolution layer 330, and the third convolution layer 350 of the upscaling neural network 300, the parameters of the filter kernel, and the like, as described below. In order to compensate for image degradation characteristics for each application, the pieces of neural network setting information have to correspond to the applications. In order for the pieces of neural network setting information to correspond to the applications, training based on a first training image provided from each of the applications is required, which will be described below with reference to FIG. 10.

FIG. 3 illustrates that the upscaling neural network 300 includes three convolution layers, for example, first, second, and third convolution layers 310, 330, and 350, and two activation layers, for example, first and second activation layers 320 and 340, but this is only an example. According to an embodiment, the number of convolution layers and the number of activation layers may be variously changed. Also, according to an embodiment, the upscaling neural network 300 may be implemented through a recurrent neural network (RNN). This case means changing a convolutional neural network (CNN) structure of the upscaling neural network 300 according to the embodiment of the disclosure to an RNN structure.

In an embodiment of the disclosure, the AI upscaler 236 may include at least one arithmetic logic unit (ALU) for the convolution operation and the operation of the activation layer described above. The ALU may be implemented as a processor. For the convolution operation, the ALU may include a multiplier that performs a multiplication operation between the sample values of the feature map or the first image 115 and the sample values of the filter kernel, and an adder that adds the result values of the multiplication operation. Also, for the operation of the activation layer, the ALU may include a multiplier that multiplies an input sample value by a weight used in a sigmoid function, a Tanh function, or an ReLU function, which is predetermined, and a comparator that compares a result of the multiplying to a certain value and determines whether to transmit the input sample value to the next layer.

Hereinafter, a method, performed by the AI setter 238, of determining the upscale target and a method, performed by the AI upscaler 236, of performing an AI upscaling process on the first image 115 according to the upscale target will be described.

In an embodiment of the disclosure, the AI setter 238 may store a plurality of pieces of neural network setting information that are settable (or applicable) in the upscaling neural network.

The pieces of neural network setting information may include information about at least one of the number of convolution layers included in the upscaling neural network, the number of filter kernels for each convolution layer, the size of each filter kernel, or the parameters of each filter kernel.

The pieces of neural network setting information may correspond to various upscale targets, respectively, and the upscaling neural network may operate based on neural network setting information corresponding to a specific upscale target.

In an embodiment of the disclosure, the upscaling neural network may have different structures from each other according to the neural network setting information. For example, the upscaling neural network may include three convolution layers according to certain neural network setting information, and the upscaling neural network may include four convolution layers according to other pieces of neural network setting information.

In an embodiment of the disclosure, the neural network setting information may include only parameters of the filter kernel used in the upscaling neural network. In this case, the structure of the upscaling neural network is not changed, but only the parameters of the internal filter kernel may be changed according to the neural network setting information.

The AI setter 238 may select neural network setting information for AI upscaling of the first image 115 from among the pieces of neural network setting information. The pieces of neural network setting information correspond to the applications. The pieces of neural network setting information may correspond to the applications one to one.

For example, as illustrated in FIG. 5, "P" neural network setting information may correspond to an "A" application, "Q" neural network setting information may correspond to a "B" application, and "R" neural network setting information may correspond to a "C" application.

Although FIG. 5 illustrates only three applications and three pieces of neural network setting information, the number of applications and neural network setting information corresponding to each other may vary.

Because the pieces of neural network setting information corresponding to the applications are trained according to images provided from the applications, the AI setter 238 has to identify which application is used to obtain the first image 115, and has to obtain neural network setting information corresponding to the identified application. When the first image 115 is obtained through the "A" application, but the neural network setting information other than the "P" neural network setting information is selected for the operation of the upscaling neural network, the image degradation characteristics caused by the "A" application may not be appropriately compensated for.

When the neural network setting information for the AI upscaling of the first image 115 from among the pieces of neural network setting information is selected, the selected neural network setting information may be transmitted to the AI upscaler 236, and the first image 115 may be processed based on the upscaling neural network operating according to the selected neural network setting information.

For example, when the neural network setting information is received from the AI setter 238, the AI upscaler 236 may set the number of filter kernels included in each layer and the parameters of the filter kernel as a value included in the obtained neural network setting information with respect to the first convolution layer 310, the second convolution layer 330, and the third convolution layer 350 of the upscaling neural network 300 illustrated in FIG. 3.

Specifically, when the parameters of the 3×3 filter kernel used in any one convolution layer of the upscaling neural network 300 illustrated in FIG. 3 are {1, 1, 1, 1, 1, 1, 1, 1, 1} and neural network setting information is changed, the AI upscaler 236 may replace the parameters of the filter kernel with {2, 2, 2, 2, 2, 2, 2, 2, 2}, which are parameters included in the changed neural network setting information.

Hereinafter, a method, performed by the AI setter 238, of identifying the application corresponding to the first image 115 so as to select neural network setting information suitable for the AI upscaling of the first image 115 from among the pieces of neural network setting information will be described.

The AI setter 238 may select the neural network setting information for the AI upscaling of the first image 115 from among the pieces of neural network setting information, based on AI data provided from the parser 232.

The AI data may include information about the application required to obtain the first image 115. The information about the application may include identification information capable of distinguishing the application from other applications, such as the name of the application.

In an embodiment of the disclosure, when the AI data includes the information about the application required to obtain the first image 115, the AI setter 238 may identify the application corresponding to the first image 115 from the AI data, and may select neural network setting information corresponding to the identified application from among the pieces of neural network setting information.

For example, when the "A" application is identified from the AI data, the AI setter 238 may select the "P" neural network setting information illustrated in FIG. 5. Similarly, when the "B" application is identified from the AI data, the AI setter 238 may select the "Q" neural network setting information illustrated in FIG. 5.

In another embodiment of the disclosure, the AI setter 238 may identify the application executed in the electronic apparatus 200 so as to obtain the first image 115, and may select neural network setting information corresponding to the identified application. Because the AI setter 238 directly identifies the application executed in the electronic apparatus 200, the AI setter 238 may select neural network setting information suitable for the first image 115 even when the AI data is not included in the AI-encoding data.

When the AI data including the information about the application is not included in the AI-encoding data, or when is difficult to identify the application executed to obtain the first image 115, it should be predicted an application through which the first image 115 is provided based on the information related to the application. This will be described with reference to FIG. 6.

FIG. 6 is a diagram illustrating information related to various applications for selection of neural network setting information.

The electronic apparatus 200 may store information related to various applications required to obtain an image from a provider.

As illustrated in FIG. 6, the information related to the applications may include at least one of information about a provider operating an application, address information to be accessed through a web browser so as to obtain an image from a provider corresponding to an application, or information related to an image obtainable from an application.

In an embodiment of the disclosure, when the AI data includes the information about the provider of the first image 115, the AI setter 238 may identify the provider of the first image 115 from the AI data, and may select neural network setting information corresponding to the identified provider from among the pieces of neural network setting information.

In another embodiment of the disclosure, when the first image 115 is received through the web browser, the AI setter 238 may select neural network setting information by comparing address information accessed by the web browser with pieces of address information related to the applications.

For example, when the first image 115 is obtained from the server having an address of www.abc.com, the AI setter 238 may select the "P" neural network setting information illustrated in FIG. 5 for the AI upscaling of the first image 115. Similarly, when the first image 115 is obtained from the server having an address of www.cde.com, the AI setter 238 may select the "R" neural network setting information illustrated in FIG. 5 for the AI upscaling of the first image 115.

When the first image 115 is obtained from the provider via the network, neural network setting information may be selected through information about the application, information about the provider, and/or an address accessed by the web browser. In particular, when the first image 115 is received through the application or the web browser in a streaming manner, it is easy to identify the type of the application or the address accessed by the web browser. However, in some cases, it may be difficult to identify the information about the application, the information about the provider, and/or the address accessed by the web browser. Therefore, the AI setter 238 may select neural network setting information for the AI upscaling of the first image 115 through the information related to the first image 115.

The method of selecting the neural network setting information through the information related to the first image 115 may be applied to the following cases.

(1) A case in which the first image 115 is received via the network and stored, and then, the first image 115 is reproduced by a general-purpose video reproduction program in response to a request from a user or an instruction.

(2) A case in which the first image 115 is captured by the user of the electronic apparatus 200.

(3) A case in which the first image 115 is obtained from an individual (e.g., a friend, a family, etc.) or source other than the provider.

In the above three cases, because it may be difficult to identify the information about the application corresponding to the first image 115 or the address accessed by the web browser, an application through which the first image 115 is similar to the image provided is predicted by comparing the information related to the first image 115 with the information about the image provided from the application.

The image-related information may include at least one of a file name of the image, whether the image is a still image or a moving image, an image resolution, a bitrate of image data corresponding to the image, a codec type used to encode the image, a quantization parameter used to encode the image, image sharpness, artifact characteristics of the image, or a type of artifacts in the image (e.g., ringing artifact, blurring artifact, or block artifact, etc.). Encoding-related information provided from the decoder 234 to the AI setter 238 may be used as the image-related information.

Characteristics of the images and the image data provided from the applications may be analyzed in advance and stored in the electronic apparatus 200. The AI setter 238 may compare information related to the images provided from the applications with information related to the first image 115 to determine an application through which the first image 115 is similar to an image provided, or to predict an application from which the image is provided.

As an example, as illustrated in FIG. 6, when the resolution of the first image 115 is HD, the bitrate of the image data corresponding to the first image 115 is 10 Mbps, and the first image 115 is encoded with HEVC, the AI setter 238 may determine that the first image 115 is similar to the image obtained through the "C" application, and may select the "R" neural network setting information from among the pieces of neural network setting information illustrated in FIG. 5.

As another example, when the file name of the first image 115 includes a word related to the "A" application, the AI setter 238 may determine that the first image 115 is obtained through the "A" application, and may select the "P" neural network setting information from among the pieces of neural network setting information illustrated in FIG. 5.

As another example, when ringing artifact is included in the first image 115 and the image received through the "B" application mainly includes ringing artifacts, the AI setter 238 may determine that the first image 115 is obtained through the "B" application, and may select the "Q" neural network setting information from among the pieces of neural network setting information illustrated in FIG. 5.

According to an embodiment, when the first image 115 is received through the application and stored, the electronic apparatus 200 may store information about the application executed to obtain the first image 115 together. When it is necessary to reproduce the first image 115, the electronic apparatus 200 may identify information about the application stored when the first image 115 is received, and may select neural network setting information corresponding to the application of the first image 115.

On the other hand, in general, an image includes an image of a luma component and an image of a chroma component. In the commonly used YUV format of 4:2:0, the size of the image of the luma component is four times greater than the size of the image of the chroma component. As such, when the image includes an image of a first color component (e.g., luma), an image of a second color component (e.g., chroma (Cb)), and an image of a third color component (e.g., chroma (Cr)) and the sizes of the images are not equal to each other, a method of efficiently AI-upscaling the corresponding image is required.

Hereinafter, when the image includes the image of a first color component, the image of the second color component, and the image of the third color component and the size of the image of the first color component is greater the sizes of the image of the second color component and the image of the third color component, an upscaling neural network for AI upscaling of the image will be described.

Figure 7:
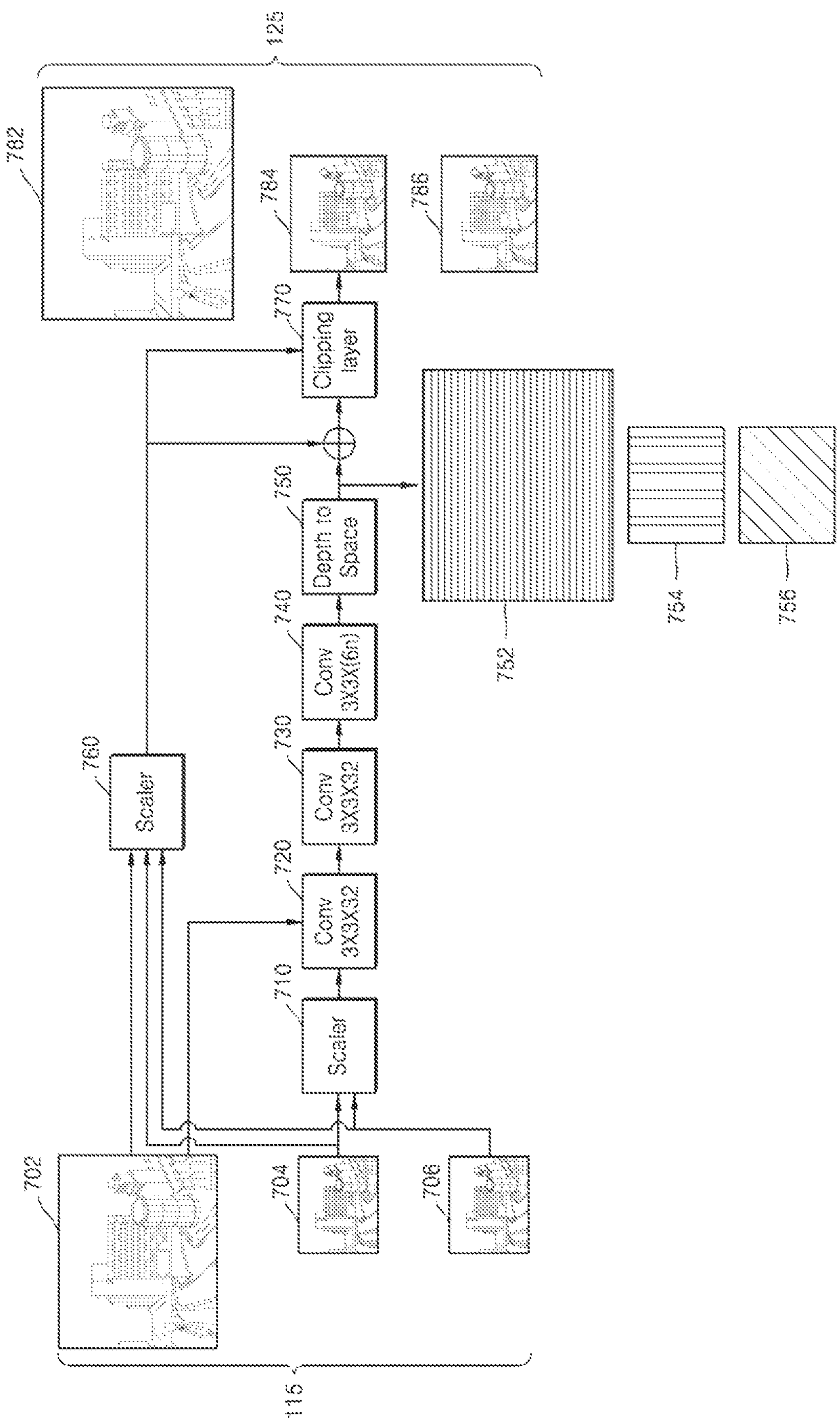
FIG. 7 is a diagram illustrating an upscaling neural network for AI upscaling of a first image.

FIG. 7 is a diagram illustrating an upscaling neural network 700 for AI upscaling of a first image 115.

As illustrated in FIG. 7, the upscaling neural network 700 may include a first scaler 710, a first convolution layer 720, a second convolution layer 730, a third convolution layer 740, a depth-to-space layer 750, a second scaler 760, and a clipping layer 770.

The first image 115 includes a first sub-image 702 of a first color component, a second sub-image 704 of a second color component, and a third sub-image 706 of a third color component. The first color component may include a luma component, the second color component may include a chroma (Cb) component, and the third color component may include a chroma (Cr) component.

In a YUV format of 4:2:0, the size of the first sub-image 702 is four times greater than the sizes of the second sub-image 704 and the third sub-image 706. In order to compensate for the size difference, the second sub-image 704 and the third sub-image 706 are input to the first scaler 710.

The first scaler 710 increases the sizes of the second sub-image 704 and the third sub-image 706. The first scaler 710 may scale the sizes of the second sub-image 704 and the third sub-image 706 to be equal to the size of the first sub-image 702.

The reason for scaling the sizes of the second sub-image 704 and the third sub-image 706 to be equal to the size of the first sub-image 702 is to add the results of the convolution operation using a filter kernel of a specific size to an image for each channel.

Specifically, in the convolution operation process, one filter kernel is convolved with each of images input thereto, and the results of the convolution operation with each of the images are added to each other to obtain one feature map corresponding to the filter kernel. When the sizes of the images to be convolved are not equal to each other, the sizes of the results of the convolution operation are also not equal to each other, and thus, it is difficult to add the results of the convolution operation.

The first scaler 710 may increase the sizes of the second sub-image 704 and the third sub-image 706 on a legacy basis, not on an AI basis. The legacy-based scaling may include at least one of a bilinear scale, a bicubic scale, a lanczos scale, or a stair step scale. According to an embodiment, the first scaler 710 may be implemented as a convolution layer.

The first sub-image 702, the scaled second sub-image 704, and the scaled third sub-image 706 are input to the first convolution layer 720.

3×3×32 indicated in the first convolution layer 720 illustrated in FIG. 7 exemplifies a convolution process on images of three channels by using 32 filter kernels each having a 3×3 size. As a result of the convolution process, 32 feature maps are generated by the 32 filter kernels.

The feature maps output from the first convolution layer 720 are input to the second convolution layer 730. 3×3×32 indicated in the second convolution layer 730 exemplifies a convolution process on the feature maps output from the previous layer 720 by using 32 filter kernels each having a 3×3 size. As a result of the convolution process, 32 feature maps are generated by the 32 filter kernels.

The feature maps output from the second convolution layer 730 are input to the third convolution layer 740. 3×3×(6n) (where n is a natural number) indicated in the third convolution layer 740 exemplifies a convolution process on the feature maps output from the previous layer 730 by using 6n filter kernels each having a 3×3 size. As a result of the convolution process, 6n feature maps are generated by the 6n filter kernels.

The feature maps output from the third convolution layer 740 are input to depth-to-space layer 750.

The depth-to-space layer 750 reduces the number of feature maps output from the previous layer 740. Specifically, the depth-to-space layer 750 may reduce the number of channels by arranging the samples of the channel direction on the spatial domain of one channel.

The operation of the depth-to-space layer 750 will be described with reference to FIG. 8.

Figure 8:
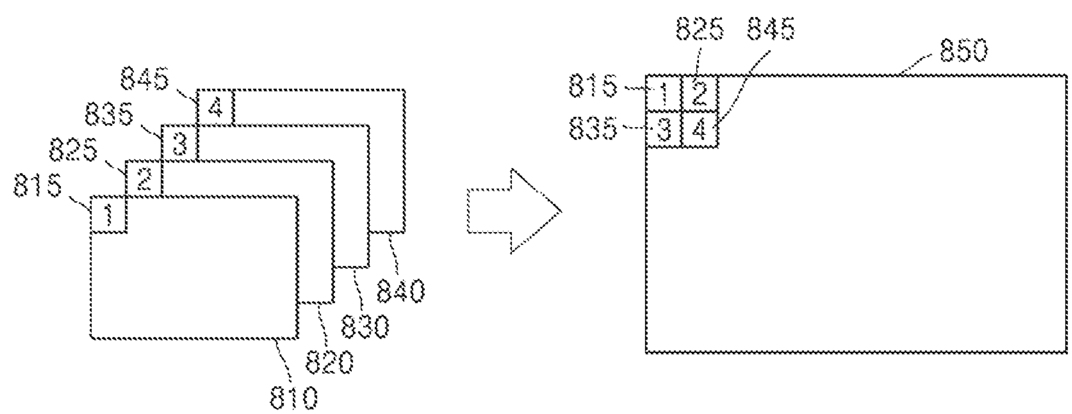
FIG. 8 is a diagram for describing an operation of a depth-to-space layer illustrated in FIG. 7.

FIG. 8 is a diagram for describing the operation of the depth-to-space layer 750 illustrated in FIG. 7.

FIG. 8 illustrates a situation in which a first feature map 810, a second feature map 820, a third feature map 830, and a fourth feature map 840 corresponding to four channels are processed by the depth-to-space layer 750 to obtain one fifth feature map 850. According to an embodiment, the number of channels input to the depth-to-space layer 750 and the number of channels output from the depth-to-space layer 750 may be variously changed.

As illustrated in FIG. 8, in the depth-to-space layer 750, samples 815, 825, 835, and 845 included in the first feature map 810, the second feature map 820, the third feature map 830, and the fourth feature map 840 are arranged in one feature map to generate one fifth feature map 850.

There may be various methods of arranging the samples of the input feature maps. Although FIG. 8 illustrates that the samples 815, 825, 835, and 845 of the same locations in the first feature map 810, the second feature map 820, the third feature map 830, and the fourth feature map 840 are arranged adjacent to each other in the fifth feature map 850, other samples may be positioned between the samples 815, 825, 835, and 845 of the same locations in the first feature map 810, the second feature map 820, the third feature map 830, and the fourth feature map 840.

Referring back to FIG. 7, the depth-to-space layer 750 generates a feature map 752 of a first color component by combining samples of 4n feature maps from among the 6n feature maps input thereto. The depth-to-space layer 750 generates a feature map 754 of a second color component by combining samples of the remaining n feature maps from among the 6n feature maps, generates a feature map 756 of a third color component by combining samples of the remaining n feature maps from among the 6n feature maps.

As described above, in the case of the YUV format of 4:2:0, the size of the first sub-image 702 is four times greater than the sizes of the second sub-image 704 and the third sub-image 706. Therefore, in order to maintain such a size relationship, a feature map 752 of a first color component is generated by using the 4n feature maps, and a feature map 754 of a second color component and a feature map 756 of a third color component are generated by using the n feature maps, respectively. Because the sizes of the feature maps output from the previous layer 740 are all equal to each other, the feature map 752 of the first color component is generated by using the 4n feature maps, and the feature map 754 of the second color component and the feature map 756 of the third color component are generated by using the n feature maps, respectively. Therefore, the size of the feature map 752 of the first color component may be four times greater than the sizes of the feature map 754 of the second color component and the feature map 756 of the third color component.

Apart from the input of the first sub-image 702, the second sub-image 704, and the third sub-image 706 to the first scaler 710 or the first convolution layer 720, the first sub-image 702, the second sub-image 704, and the third sub-image 706 may be input to the second scaler 760.

The second scaler 760 scales the sizes of the first sub-image 702, the second sub-image 704, and the third sub-image 706 according to the scaling factor of the upscaling neural network 700. The scaling factor of the upscaling neural network 700 refers to a ratio of the size of the first image 115 to the size of the second image 125.

The second scaler 760 may increase the sizes of the first sub-image 702, the second sub-image 704, and the third sub-image 706 on a legacy basis, not on an AI basis. The legacy-based scaling may include at least one of a bilinear scale, a bicubic scale, a lanczos scale, or a stair step scale. According to an embodiment, the second scaler 760 may be implemented as a convolution layer.

The first sub-image 702, the second sub-image 704, and the third sub-image 706, which are scaled by the second scaler 760, are added to the feature map 752 of the first color component, the feature map 754 of the second color component, and the feature map 756 of the third color component, respectively. In this case, the images and the feature maps of the same color component are added.

A prediction version of the second image 125 is obtained through the second scaler 760 having a skip connection structure, and a residual version of the second image 125 is obtained by the first scaler 710 or the depth-to-space layer 750. The second image 125 may be obtained by adding the prediction version and the residual version of the second image 125.

The clipping layer 770 prevents overshooting of the addition result of the images output from the second scaler 760 and the feature maps output from the depth-to-space layer 750.

The clipping layer 770 may clip sample values resulting from the addition of the images output from the second scaler 760 and the feature maps output from the depth-to-space layer 750 according to Equation 1 below.

second image=clip(res+skip,skip*ratio_lowerbound, skip*ratio_upperbound) [Equation 1]

In Equation 1, res represents the residual version of the second image 125, that is, the samples of the feature maps output from the depth-to-space layer 750, and skip represents the prediction version of the second image 125, that is, the samples of the images output from the second scaler 760. Also, ratio_lowerbound and ratio_upperbound represent predetermined values, and represent values for limiting the sample values of the second image 125 within a certain range.

Referring to Equation 1, the addition result of the first sub-image 702 (i.e., skip) scaled by the second scaler 760 and the feature map 752 (i.e., res) of the first color component output by the depth-to-space layer 750 is clipped within a value obtained by multiplying ratio_lowerbound and ratio_upperbound by the first sub-image 702 (i.e., skip) scaled by the second scaler 760.

Also, the addition result of the second sub-image 704 (i.e., skip) scaled by the second scaler 760 and the feature map 754 (i.e., res) of the second color component output by the depth-to-space layer 750 is clipped within a value obtained by multiplying ratio_lowerbound and ratio_upperbound by the second sub-image 704 (i.e., skip) scaled by the second scaler 760.

Also, the addition result of the third sub-image 706 (i.e., skip) scaled by the second scaler 760 and the feature map 756 (i.e., res) of the third color component output by the depth-to-space layer 750 is clipped within a value obtained by multiplying ratio_lowerbound and ratio_upperbound by the third sub-image 706 (i.e., skip) scaled by the second scaler 760.

As a result of the clipping by the clipping layer 770, the second image 125 including a fourth sub-image 782 of the first color component, a fifth sub-image 784 of the second color component, and a sixth sub-image 786 of the third color component may be obtained.

In an embodiment of the disclosure, the second scaler 760 and/or the clipping layer 770 may be omitted from the upscaling neural network 700, and the number of convolution layers may be variously changed. Also, although not illustrated in FIG. 7, one or more activation layers described with reference to FIG. 3 may be included in the upscaling neural network 700. Also, the size and the number of filter kernels illustrated in FIG. 7 are only an example, and may be variously changed according to an implementation.

On the other hand, the upscaling neural network 700 illustrated in FIG. 7 is for the case in which the size of the first sub-image 702 is four times greater than the sizes of the second sub-image 704 and the third sub-image 706. When the size of the first sub-image 702 is k times greater than the sizes of the second sub-image 704 and the third sub-image 706, the scaling factor of the first scaler 710 is k. When "a" feature maps are used to generate the feature map 752 of the first color component in the depth-to-space layer 750, "a/k" feature maps may be used to generate the feature map 754 of the second color component and the feature map 756 of the third color component. To this end, "k+(a/k)+(a/k)" feature maps may be output from the previous layer 740.

Figure 9:
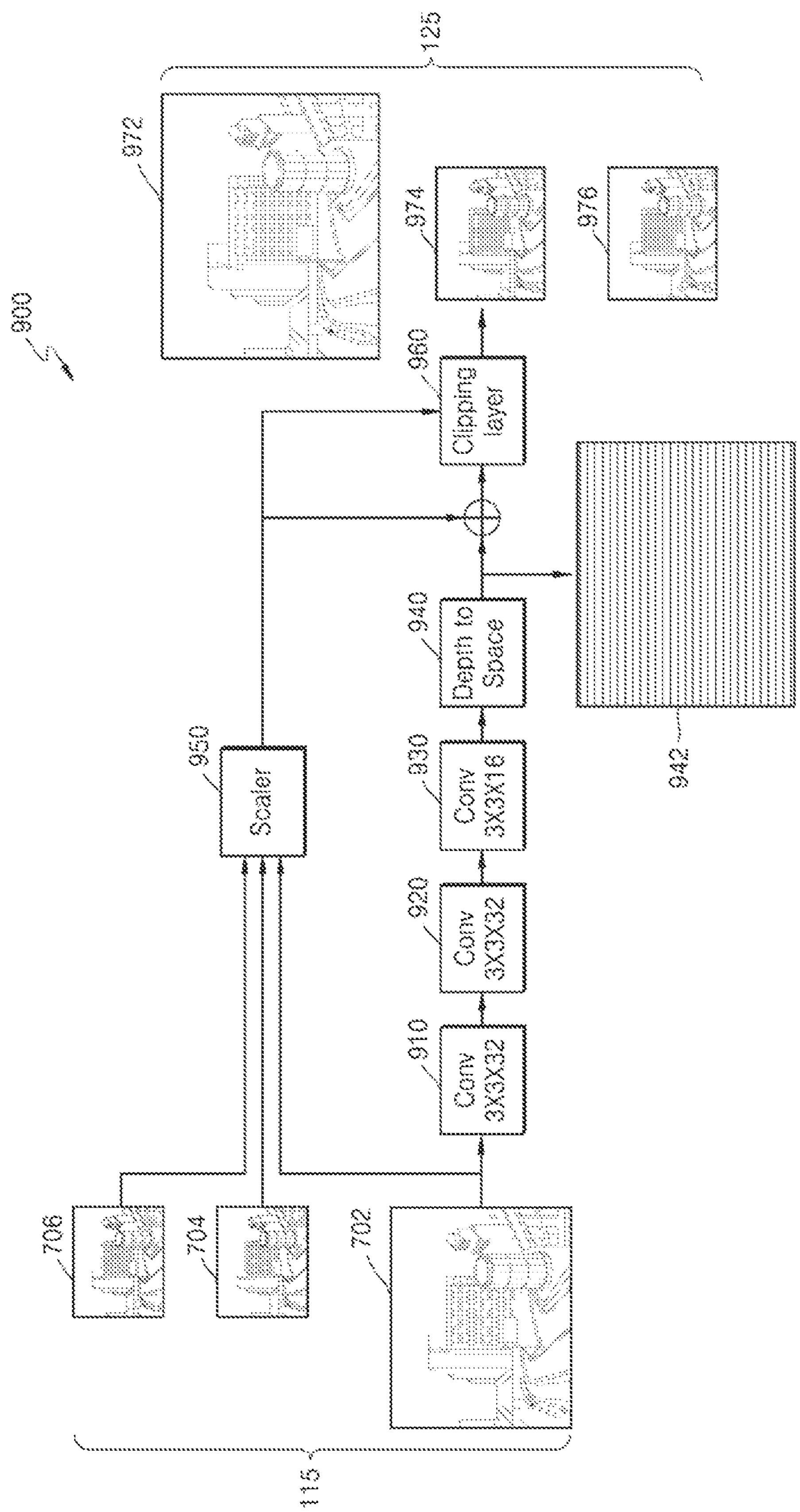
FIG. 9 is a diagram illustrating an upscaling neural network for AI upscaling of a first image.

FIG. 9 is a diagram illustrating an upscaling neural network 900 for AI upscaling of a first image 115, according to another embodiment of the disclosure.

As illustrated in FIG. 9, the upscaling neural network 900 may include a first convolution layer 910, a second convolution layer 920, a third convolution layer 930, a depth-to-space layer 940, a scaler 950, and a clipping layer 960.

The first image 115 includes a first sub-image 702 of a first color component, a second sub-image 704 of a second color component, and a third sub-image 706 of a third color component. The first color component may include a luma component, the second color component may include a chroma (Cb) component, and the third color component may include a chroma (Cr) component.

In a YUV format of 4:2:0, the size of the first sub-image 702 is four times greater than the sizes of the second sub-image 704 and the third sub-image 706. Due to the size difference, only the first sub-image 702 from among the first sub-image 702, the scaled second sub-image 704, and the third sub-image 706 is input to the first convolution layer 910.

3×3×32 indicated in the first convolution layer 910 illustrated in FIG. 9 exemplifies a convolution process on images of one channel by using 32 filter kernels each having a 3×3 size. As a result of the convolution process, 32 feature maps are generated by the 32 filter kernels.

The feature maps output from the first convolution layer 910 are input to the second convolution layer 920. 3×3×32 indicated in the second convolution layer 920 exemplifies a convolution process on feature maps output from the previous layer by using 32 filter kernels each having a 3×3 size. As a result of the convolution process, 32 feature maps are generated by the 32 filter kernels.

The feature maps output from the second convolution layer 920 are input to the third convolution layer 930. 3×3×16 indicated in the third convolution layer 930 exemplifies a convolution process on feature maps output from the previous layer 920 by using 16 filter kernels each having a 3×3 size. As a result of the convolution process, 16 feature maps are generated by the 16 filter kernels.

The feature maps output from the third convolution layer 930 are input to depth-to-space layer 940.

The depth-to-space layer 940 generates a feature map 942 of the first color component by combining samples of the feature maps output from the third convolution layer 930.

Apart from the input of the first sub-image 702 to the first convolution layer 910, the first sub-image 702, the second sub-image 704, and the third sub-image 706 may be input to the scaler 950.

The scaler 950 scales the sizes of the first sub-image 702, the second sub-image 704, and the third sub-image 706 according to the scaling factor of the upscaling neural network 900.

The scaler 950 may increase the sizes of the first sub-image 702, the second sub-image 704, and the third sub-image 706 on a legacy basis, not on an AI basis. The legacy-based scaling may include at least one of a bilinear scale, a bicubic scale, a lanczos scale, or a stair step scale. According to an embodiment, the scaler 950 may be implemented as a convolution layer.

The first sub-image 702 scaled by the scaler 950 is added to the feature map 942 of the first color component. Because the feature map of the same color component does not exist in the second sub-image 704 and the third sub-image 706, which are scaled by the scaler 950, the addition result of the first sub-image 702 scaled by the scaler 950 and the feature map 942 of the first color component is transmitted to the clipping layer 960 as it is.

A prediction version of a fourth sub-image 972 of the first color component is obtained through the scaler 950 having a skip connection structure, and a residual version of the fourth sub-image 972 is obtained by the first convolution layer 910 to the depth-to-space layer 940. The fourth sub-image 972 constituting the second image 125 may be obtained by adding the prediction version of the fourth sub-image 972 to the residual version of the fourth sub-image 972.

The clipping layer 960 prevents overshooting of the addition result of the images output from the scaler 950 and the feature maps output from the depth-to-space layer 940.

The clipping layer 960 may clip sample values resulting from the addition of the images output from the scaler 950 and the feature maps output from the depth-to-space layer 940 according to Equation 1 above.

As a result of the clipping by the clipping layer 960, the second image 125 including the fourth sub-image 972 of the first color component, the fifth sub-image 974 of the second color component, and the sixth sub-image 976 of the third color component may be obtained.

In an embodiment of the disclosure, the scaler 950 and/or the clipping layer 960 may be omitted from the upscaling neural network 900, and the number of convolution layers may be variously changed. Also, although not illustrated in FIG. 9, one or more activation layers described with reference to FIG. 3 may be included in the upscaling neural network 900. Also, the size and the number of filter kernels illustrated in FIG. 9 are only an example, and may be variously changed according to an implementation.

Because the upscaling neural network 900 illustrated in FIG. 9 performs the convolution process only on the first sub-image 702, the amount of computations may be significantly reduced, compared with the upscaling neural network 700 illustrated in FIG. 7.

Hereinafter, a method of training an upscaling neural network 1000 will be described with reference to FIG. 10.

Figure 10:
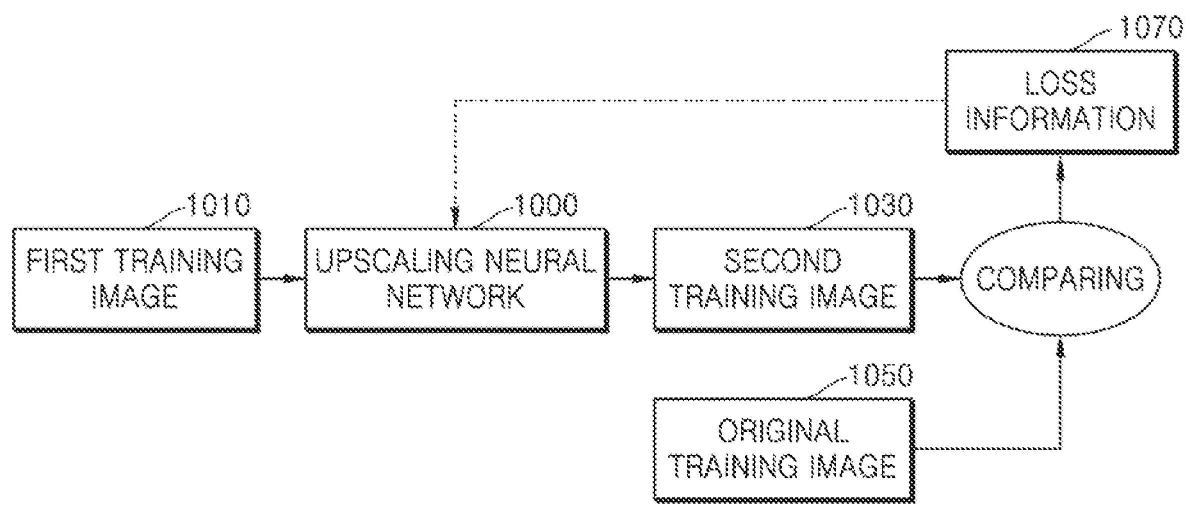
FIG. 10 is a diagram for describing a method of training an upscaling neural network.

FIG. 10 is a diagram for describing the method of training the upscaling neural network 1000.

The upscaling neural network 1000 may have the structure of the upscaling neural network 300, 700, or 900.

According to an embodiment of the disclosure, the upscaling neural network 1000 may have various structures including one or more convolution layers.

As described above, AI upscaling is performed on the first image 115 with neural network setting information corresponding to the application used to obtain the first image 115. Because the AI upscaling of the first image 115 depends on the application used to obtain the first image 115, it is necessary to obtain neural network setting information specialized for each application.

In FIG. 10, a first training image 1010 refers to an image obtained from an application, and a second training image 1030 refers to an image that is AI-upscaled from the first training image 1010 through the upscaling neural network 1000. Also, an application or a provider operating the application processes an original training image 1050 to generate the first training image 1010. The application or the provider operating the application may process (e.g., resolution-convert and encode) the original training image 1050 to generate the first training image 1010, and may provide the first training image 1010 to the electronic apparatus 200 or a training apparatus 1100 to be described below in response to a request from the electronic apparatus 200 or the training apparatus 1100. For example, for the training of the upscaling neural network 1000, the electronic apparatus 200 or the training apparatus 1100 may upload the original training image 1050 to a provider (or a server operated by the provider) and may obtain the first training image 1010 processed by the provider through the application.

The upscaling neural network 1000 is trained based on loss information 1070 corresponding to a result of comparison between the second training image 1030 and the original training image 1050.

Specifically, the upscaling neural network 1000 generates the second training image 1030 by AI-upscaling the first training image 1010 according to preset neural network setting information. The neural network setting information of the upscaling neural network 1000 is updated according to the loss information 1070 corresponding to a result of comparison between the second training image 1030 and the original training image 1050. The upscaling neural network 1000 may update neural network setting information, for example, parameters, so that the loss information 1070 is reduced or minimized. Also, the upscaling neural network 1000 may update the neural network setting information so that the loss information 1070 is reduced or minimized.

The loss information 1070 corresponding to a result of comparison between the second training image 1030 and the original training image 1050 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value with respect to the difference between the second training image 1030 and the original training image 1050.

In order to obtain pieces of neural network setting information corresponding to a plurality of applications, the first training images 1010 provided from the applications may be used for training. For example, as a result of training the upscaling neural network 1000 based on the first training image 1010 obtained through a first application, neural network setting information corresponding to the first application may be obtained. As a result of training the upscaling neural network 1000 based on the first training image 1010 obtained through a second application, neural network setting information corresponding to the second application may be obtained. That is, as the upscaling neural network 1000 is individually trained from the first training images 1010 provided through each application, a plurality of pieces of neural network setting information corresponding to a plurality of applications may be obtained.

Figure 11:
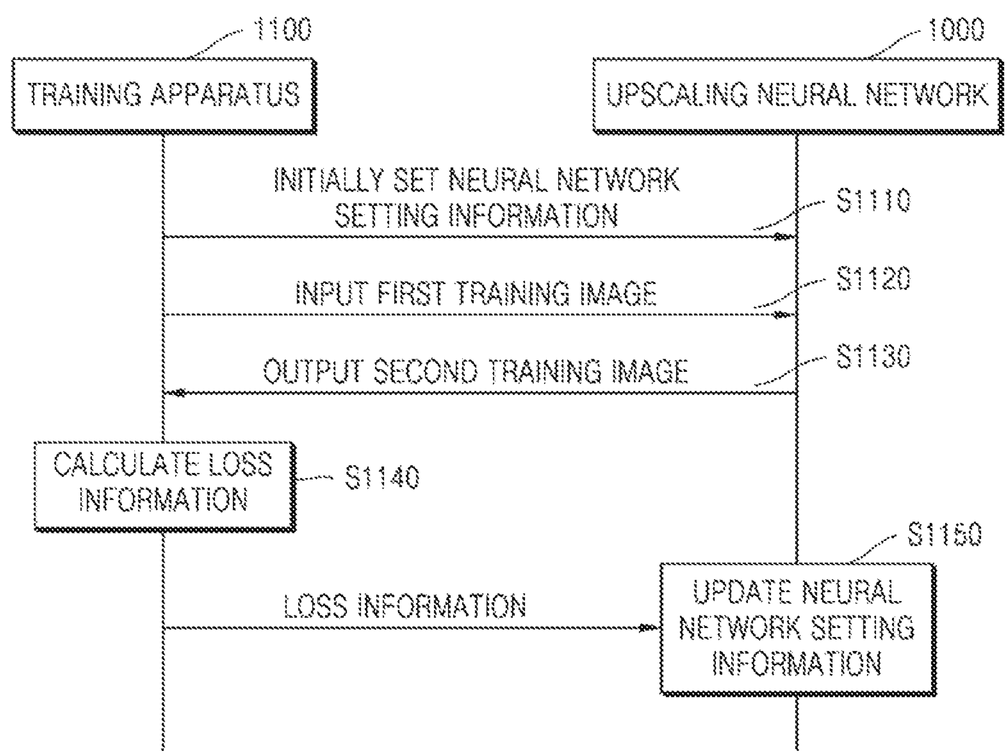
FIG. 11 is a diagram for describing a training process, performed by a training apparatus, of an upscaling neural network.

FIG. 11 is a diagram for describing a process, performed by a training apparatus 1100, of training an upscaling neural network 1000.

The training of the upscaling neural network 1000 described above with reference to FIG. 10 may be performed by the training apparatus 1100. The training apparatus 1100 may be, for example, the electronic apparatus 200 or a separate server. Neural network setting information of the upscaling neural network 1000 obtained as a result of training is stored in the electronic apparatus 200.

Referring to FIG. 11, the training apparatus 1100 initially sets neural network setting information of the upscaling neural network 1000 (S1110). Therefore, the upscaling neural network 1000 may operate according to predetermined neural network setting information. The neural network setting information may include information about at least one of the number of convolution layers included in the upscaling neural network 1000, the number of filter kernels for each convolution layer, the size of the filter kernel for each convolution layer, or the parameters of each filter kernel.

The training apparatus 1100 inputs, to the upscaling neural network 1000, the first training image 1010 obtained through the application (S1120).

The upscaling neural network 1000 processes the first training image 1010 according to the initially set neural network setting information, and outputs the second training image 1030 that is AI-upscaled from the first training image 1010 (S1130).

The training apparatus 1100 calculates the loss information 1070 based on the second training image 1030 and the original training image 1050 (S1140).

The training apparatus provides the loss information 1070 to the upscaling neural network 1000 and the upscaling neural network 1000 updates the initially set neural network setting information through a back propagation process based on the loss information 1070 (S1150).

Then, the training apparatus 1100 and the upscaling neural network 1000 update the neural network setting information while repeating operations S1120 to S1150 until the loss information 1070 is minimized. At this time, while operations are repeated, the upscaling neural network 1000 operates according to the neural network setting information updated in the previous process.

Figure 12:
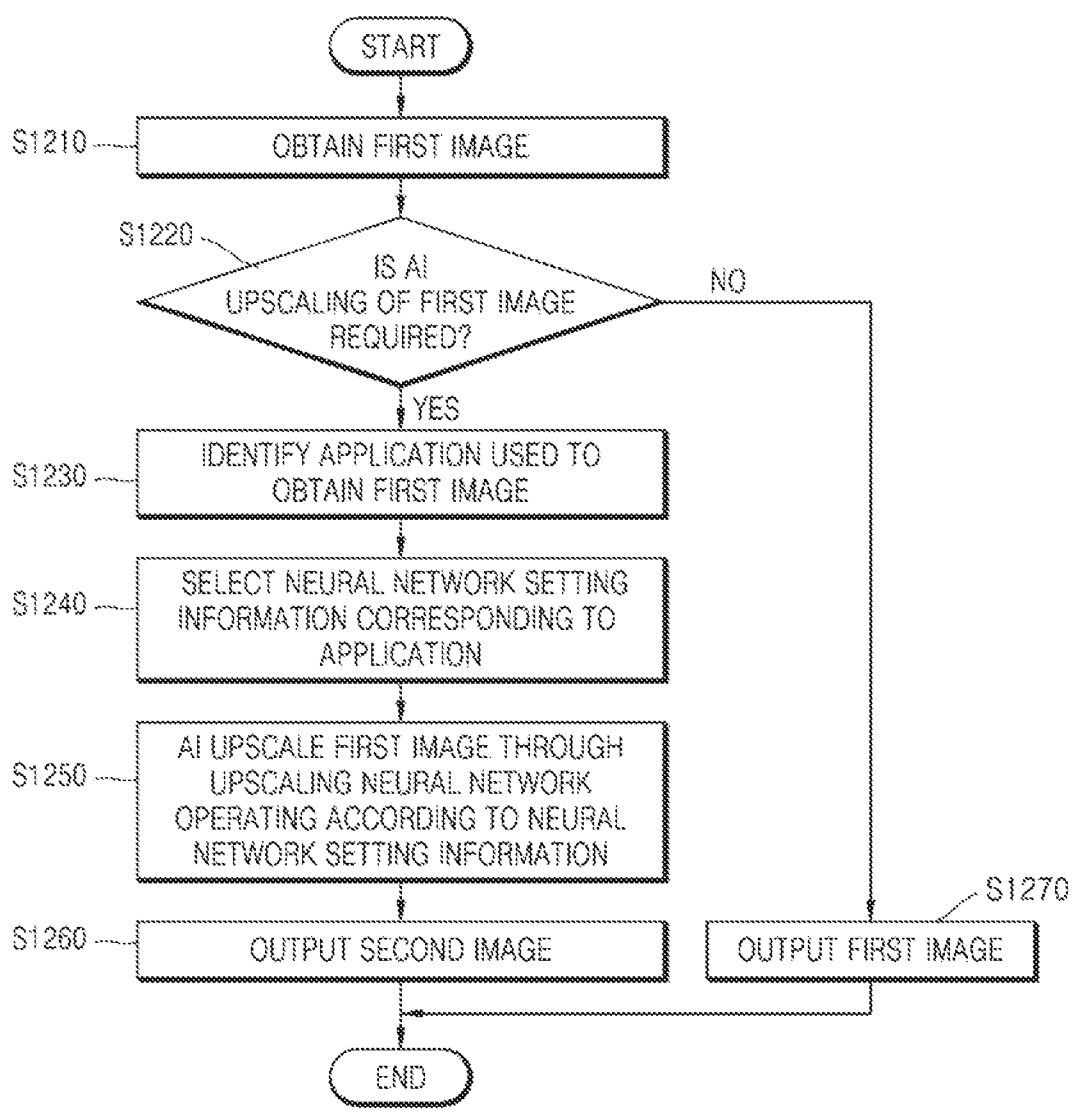
FIG. 12 is a flowchart of an AI decoding method performed by an electronic apparatus, according to an embodiment of the disclosure.

FIG. 12 is a flowchart of an AI decoding method performed by an electronic apparatus 200, according to an embodiment of the disclosure.

In operation S1210, the electronic apparatus 200 obtains the first image 115. The electronic apparatus 200 may obtain image data of the first image 115 and may also obtain the first image 115 by decoding the image data.

The electronic apparatus 200 may obtain the first image 115 via the network, or may obtain the first image 115 from a storage medium of the electronic apparatus 200 in which the first image 115 is stored.

In operation S1220, the electronic apparatus 200 determines whether the AI upscaling of the first image 115 is required. The electronic apparatus 200 may determine whether the AI upscaling is required, based on the resolution of the first image 115.

For example, when the resolution of the first image 115 is less than or equal to a first predetermined resolution, the electronic apparatus 200 may determine that the AI upscaling is not required, and when the resolution of the first image 115 is greater than the first predetermined resolution, the electronic apparatus 200 may determine that the AI upscaling is required.

As another example, when the resolution of the first image 115 is greater than or equal to a second predetermined resolution, the electronic apparatus 200 may determine that the AI upscaling is not required, and when the resolution of the first image 115 is less than the second predetermined resolution, the electronic apparatus 200 may determine that the AI upscaling is required.

As another example, when the resolution of the first image 115 is between the first predetermined resolution and the second predetermined resolution, the electronic apparatus 200 may determine that the AI upscaling is required, and when the resolution of the first image 115 is out of the range between the first predetermined resolution and the second predetermined resolution, the electronic apparatus 200 may determine that the AI upscaling is not required.

In operation S1230, when it is determined that AI upscaling is required, the electronic apparatus 200 identifies an application used to obtain the first image 115.

The electronic apparatus 200 may identify an application corresponding to the first image 115 by using at least one of application information required (or used) to obtain the first image 115, address information accessed by a web browser so as to obtain the first image 115, provider information of the first image 115, or information related to the first image 115.

Because the method of identifying or predicting the application corresponding to the first image 115 has been described above, detailed descriptions thereof are omitted.

In operation S1240, the electronic apparatus 200 selects neural network setting information corresponding to the application identified in operation S1230 from among a plurality of pieces of prestored neural network setting information.

In operation S1250, the electronic apparatus 200 obtains the second image 125 by AI-upscaling the first image 115 through the upscaling neural network operating according to the selected neural network setting information.

In operation S1260, the electronic apparatus 200 outputs the second image 125. The electronic apparatus 200 may output the second image 125 to a display, and when necessary, the display may post-process and reproduce the second image 125.

In operation S1220, when it is determined in operation S1220 that the AI upscaling is not required, the electronic apparatus 200 outputs the first image 115. The electronic apparatus 200 may output the first image 115 to the display, and when necessary, the display may post-process and reproduce the first image 115.

The above-described embodiments of the disclosure may be written as programs or instructions that may be executed on a computer, and the written programs or instructions may be stored in a medium.

A machine-readable storage medium may be provided in the form of a non-transitory storage medium. The "non-transitory storage medium" is a tangible device and only means not including a signal (e.g., electromagnetic wave). This term does not distinguish between a case in which data is stored semi-permanently in a storage medium and a case in which data is temporarily stored in a storage medium. For example, the "non-transitory storage medium" may include a buffer in which data is temporarily stored.

According to an embodiment of the disclosure, the methods according to various embodiments of the disclosure disclosed herein may be provided by being included in a computer program product. The computer program products may be traded between a seller and a buyer as commodities. The computer program product may be distributed in the form of a machine-readable storage medium (e.g., compact disc read only memory (CD-ROM)), or may be distributed (e.g., downloaded or uploaded) online, either via an application store (e.g., Play Store™) or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The model related to the neural network described above may be implemented as a software module. When implemented as a software module (e.g., a program module including instructions), the neural network model may be stored in a computer-readable recording medium.

Also, the neural network model may be integrated in the form of a hardware chip and become a part of the electronic apparatus 200 described above. For example, the neural network model may be manufactured in the form of a dedicated hardware chip for AI, or may be manufactured as a part of an existing general-purpose processor (e.g., a CPU or an application processor) or a dedicated graphic processor (e.g., a GPU).

Also, the neural network model may be provided in the form of downloadable software. A computer program product may include a product (e.g., a downloadable application) in the form of a software program that is electronically distributed through a manufacturer or an electronic market. For electronic distribution, at least a part of the software program may be stored in a storage medium or may be temporarily generated. In this case, the storage medium may be a server of a manufacturer or an electronic market, or a storage medium of a relay server.

Although certain embodiments of the disclosure have been described in detail, but the disclosure is not limited to the above-described embodiments such that various modifications and changes may be made thereto by those of ordinary skill in the art within the scope of the technical idea of the disclosure.

What is claimed is:

1. An electronic apparatus for reproducing an image, the electronic apparatus comprising:
- a display;
- at least one processor; and
- a memory configured to store instructions which, when executed by the at least one processor, cause the electronic apparatus to:
  - obtain a first image,
  - identify an application used by the electronic apparatus to obtain the first image from a provider through a network,
  - select neural network setting information corresponding to the identified application from among a plurality of pieces of neural network setting information,
  - obtain a second image by artificial intelligence (AI)-upscaling the first image by using an upscaling neural network to which the selected neural network setting information is applied, and
  - output the obtained second image via the display.

2. The electronic apparatus of claim 1, wherein the processor is further configured to select the neural network setting information by comparing information about images provided through a plurality of applications with information related to the first image.

3. The electronic apparatus of claim 1, wherein the processor is further configured to:

identify an address accessed by a web browser to obtain the first image, and select the neural network setting information by comparing the identified address with addresses corresponding to a plurality of applications.

4. The electronic apparatus of claim 1, wherein the upscaling neural network is trained based on comparison of an original training image with a second training image that is AI-upscaled, by the upscaling neural network, from a first training image provided through a plurality of applications.

5. The electronic apparatus of claim 4, wherein neural network setting information corresponding to a first application is obtained through training the upscaling neural network based on a first training image provided by the first application from among the plurality of applications, and neural network setting information corresponding to a second application is obtained through training the upscaling neural network based on a first training image provided by the second application from among the plurality of applications.

6. The electronic apparatus of claim 1, wherein the processor is further configured to:

determine whether to perform the AI upscaling based on a comparison of a resolution of the obtained first image with a predetermined resolution, based on determining not to perform the AI upscaling, output the first image via the display, and based on determining to perform the AI upscaling, output the second image via the display.

7. The electronic apparatus of claim 1, wherein the first image comprises a first sub-image of a first color component, a second sub-image of a second color component, and a third sub-image of a third color component, wherein a size of the first sub-image is greater than a size of the second sub-image and a size of the third sub-image, wherein the upscaling neural network comprises:

a first scaling layer configured to scale the size of the second sub-image and the size of the third sub-image to be equal to the size of the first sub-image;

at least one convolution layer configured to perform a convolution process on the first sub-image, the scaled second sub-image, and the scaled third sub-image; and a depth-to-space layer configured to generate a feature map of the first color component, a feature map of the second color component, and a feature map of the third color component by combining parts of feature maps output from the at least one convolution layer, and wherein the processor is further configured to obtain the second image comprising a fourth sub-image of the first color component corresponding to the feature map of the first color component, a fifth sub-image of the second color component corresponding the feature map of the second color component, and a sixth sub-image of the third color component corresponding to the feature map of the third color component.

8. The electronic apparatus of claim 7, wherein the size of the first sub-image is n times greater than the size of the second sub-image and the size of the third sub-image, n being a natural number, and wherein a number of feature maps used to generate the feature map of the first color component is n times greater than a number of feature maps used to generate the feature map of the second color component and the feature map of the third color component.

9. The electronic apparatus of claim 7, wherein the upscaling neural network further comprises a second scaling layer configured to scale the first sub-image, the second sub-image, and the third sub-image, based on a scaling factor of the upscaling neural network, and wherein the processor is further configured to obtain the fourth sub-image by adding the scaled first sub-image to the feature map of the first color component, obtain the fifth sub-image by adding the scaled second sub-image to the feature map of the second color component, and obtain the sixth sub-image by adding the scaled third sub-image to the feature map of the third color component.

10. The electronic apparatus of claim 7, wherein sample values of the fourth sub-image, the fifth sub-image, and the sixth sub-image are clipped to a value within a predetermined range.

11. The electronic apparatus of claim 1, wherein the first image comprises a first sub-image of a first color component, a second sub-image of a second color component, and a third sub-image of a third color component, wherein the upscaling neural network comprises:

at least one convolution layer configured to perform a convolution process on the first sub-image; and a depth-to-space layer configured to generate a feature map of the first color component by combining feature maps output from the at least one convolution layer, and wherein the processor is further configured to obtain the second image comprising a fourth sub-image of the first color component corresponding to the feature map of the first color component, a fifth sub-image of the second color component scaled from the second sub-image by a scaling factor of the upscaling neural network, and a sixth sub-image of the third color component scaled from the third sub-image by a scaling factor of the upscaling neural network.

12. The electronic apparatus of claim 1, wherein the upscaling neural network is trained based on a training image that obtained using the application and AI-upscaled by the upscaling neural network.

13. The electronic apparatus of claim 1, wherein the application is stored in the memory of the electronic apparatus.

14. A method of reproducing an image, the method being executed by an electronic device and comprising:

obtaining a first image;

identifying an application used by the electronic device to obtain the first image from a provider through a network;

selecting neural network setting information corresponding to the identified application from among a plurality of pieces of neural network setting information;

obtaining a second image by artificial intelligence (AI)-upscaling the first image by using an upscaling neural network to which the selected neural network setting information is applied; and providing the obtained second image to a display.

15. The method of claim 14, wherein the selecting the neural network setting information comprises selecting the neural network setting information based on a comparison of information about images provided through a plurality of applications with information related to the first image.

16. The method of claim 14, wherein the selecting the neural network setting information comprises:

identifying an address accessed by a web browser to obtain the first image; and selecting the neural network setting information by comparing the identified address with addresses corresponding to a plurality of applications.

17. A non-transitory computer-readable recording medium having recorded thereon a program that is executable by at least one processor of an electronic device to cause the electronic device to perform a method of reproducing an image, the method comprising:

obtaining a first image;

identifying an application used by the electronic device to obtain the first image from a provider through a network;

selecting neural network setting information corresponding to the identified application from among a plurality of pieces of neural network setting information;

obtaining a second image by artificial intelligence (AI)-upscaling the first image by using an upscaling neural network to which the selected neural network setting information is applied; and providing the obtained second image to a display.

18. An electronic apparatus for reproducing an image, the electronic apparatus comprising:

a display;

at least one processor; and a memory configured to store instructions which, when executed by the at least one processor, cause the electronic apparatus to:

obtain a first image, identify an address accessed by a web browser to obtain the first image, select neural network setting information corresponding to the identified address from among a plurality of neural network setting information, obtain a second image by artificial intelligence (AI)-upscaling the first image by using an upscaling neural network to which the selected neural network setting information is applied, and output the obtained second image via the display.

* * * * *